(12) United States Patent
Duggal et al.

(10) Patent No.: US 12,476,297 B2
(45) Date of Patent: Nov. 18, 2025

(54) SYSTEMS AND METHODS FOR MAINTAINING TEMPERATURES OF INTERIOR HOUSINGS BASED ON CURRENT LEVELS OF BATTERIES

(71) Applicant: General Electric Company, Schenectady, NY (US)

(72) Inventors: Anil Raj Duggal, Niskayuna, NY (US); Richard Louis Hart, Niskayuna, NY (US); Douglas Carl Hofer, Niskayuna, NY (US)

(73) Assignee: GE GRID SOLUTIONS LLC, Atlanta, GA (US)

( * ) Notice: Subject to any disclaimer, the term of this patent is extended or adjusted under 35 U.S.C. 154(b) by 634 days.

(21) Appl. No.: 17/763,121

(22) PCT Filed: Sep. 26, 2019

(86) PCT No.: PCT/US2019/053270
§ 371 (c)(1),
(2) Date: Mar. 23, 2022

(87) PCT Pub. No.: WO2021/061136
PCT Pub. Date: Apr. 1, 2021

(65) Prior Publication Data
US 2022/0344740 A1 Oct. 27, 2022

(51) Int. Cl.
*H01M 10/633* (2014.01)
*G01R 31/367* (2019.01)
(Continued)

(52) U.S. Cl.
CPC ........ *H01M 10/633* (2015.04); *G01R 31/367* (2019.01); *H01M 10/613* (2015.04); *H01M 10/6566* (2015.04); *H01M 10/658* (2015.04)

(58) Field of Classification Search
CPC ............ H01M 10/633; H01M 10/613; H01M 10/6566; H01M 10/658; G01R 31/367
(Continued)

(56) References Cited

U.S. PATENT DOCUMENTS 8,796,994 B2   8/2014  Abe et al.
10,147,976 B2  12/2018 Fukuhara
(Continued)

FOREIGN PATENT DOCUMENTS

EP    3425721 A1   1/2019
JP    4313011 B2   8/2009
(Continued)

OTHER PUBLICATIONS

"Each." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1242764. (Year: 2010).*
(Continued)

*Primary Examiner* — Sean P Cullen
(74) *Attorney, Agent, or Firm* — Armstrong Teasdale LLP

(57) ABSTRACT

An energy storage system is disclosed. The energy storage system includes an insulated housing defining an interior chamber, a battery disposed within the interior chamber of the insulated housing, a cooling system configured to manage a temperature of the interior chamber of the insulated housing, and a temperature controller communicatively coupled to the cooling system and comprising at least one processor in communication with at least one memory device. The at least one processor is configured to determine a reference current level at the battery, compute, based on the reference current level, a target temperature for the interior chamber of the insulated housing, and instruct the
(Continued)

cooling system to maintain the temperature in the interior chamber of the insulated housing at the target temperature.

17 Claims, 2 Drawing Sheets

(51) Int. Cl.
*H01M 10/613* (2014.01)
*H01M 10/6566* (2014.01)
*H01M 10/658* (2014.01)

(58) Field of Classification Search
USPC .................................. 429/120, 156, 159
See application file for complete search history.

(56) References Cited

U.S. PATENT DOCUMENTS

| | | | |
|---|---|---|---|
| 2009/0234598 A1 | 9/2009 | Angquist et al. | |
| 2015/0280294 A1* | 10/2015 | Shin | B60L 58/26 |
| | | | 429/50 |
| 2015/0331059 A1* | 11/2015 | Okada | H01M 10/48 |
| | | | 320/134 |
| 2016/0211561 A1* | 7/2016 | Nakagawa | H01M 10/625 |
| 2017/0062885 A1 | 3/2017 | Cutright et al. | |
| 2018/0145379 A1 | 5/2018 | You et al. | |
| 2021/0028504 A1* | 1/2021 | Tomoto | H01M 50/284 |

FOREIGN PATENT DOCUMENTS

| | | |
|---|---|---|
| JP | 2015133290 A | 7/2015 |
| JP | 2018163767 A1 | 10/2018 |
| JP | 2019161791 A | 9/2019 |
| KR | 2017-0124884 | 11/2017 |

OTHER PUBLICATIONS

Hirose et al., "Battery case with thermal insulation for telecommunications outdoor cabinets", Proceedings of Power and Energy Systems in Converging Markets, 1997, p. 605-610, Conference Location: Melbourne.

Schimpe et al., "Comprehensive Modeling of Temperature-Dependent Degradation Mechanisms in Lithium Iron Phosphate Batteries," Journal of the Electromechanical Society, 165 (2) A181-A193, 2018.

International Search Report and Written Opinion issued in International Application No. PCT/US2019/053270, mailed Jun. 17, 2020, 16 pages.

* cited by examiner

SYSTEMS AND METHODS FOR MAINTAINING TEMPERATURES OF INTERIOR HOUSINGS BASED ON CURRENT LEVELS OF BATTERIES

CROSS-REFERENCE TO RELATED APPLICATION

This application is a National Stage Entry of International Patent Application No. PCT/US2019/053270, filed on Sep. 26, 2019, which is hereby incorporated by reference in its entirety.

BACKGROUND

The field of the invention relates generally to energy storage systems, and more particularly, to a system and method for thermal control of an energy storage system that controls temperature to increase battery lifetime.

Battery life is affected by many different factors, such as temperature, charge current, and discharge current. Accordingly, the lifetime of the battery can be improved by keeping the battery at a target temperature. At least some known systems control the temperature of a battery to prolong battery life by keeping the battery at a particular temperature calibrated to lengthen battery life. However, the target temperature for maximum battery life depends on the charge and discharge current of the battery, which may change based on the needs of the battery. For example, the current level through a battery is different depending on whether the battery is charging, discharging, or standing by, and the rate at which the battery is charging or discharging. As such, a battery kept at a single temperature may not experience improved lifetime with respect to each of the different current levels that may be experienced by the battery during normal operation. An improved system for thermal control of an energy storage system is therefore desirable.

BRIEF DESCRIPTION

In one aspect, an energy storage system is disclosed. The energy storage system includes an insulated housing defining an interior chamber, a battery disposed within the interior chamber of the insulated housing, a cooling system configured to manage a temperature of the interior chamber of the insulated housing, and a temperature controller communicatively coupled to the cooling system and including at least one processor in communication with at least one memory device. The at least one processor is configured to determine a reference current level at the battery, compute, based on the reference current level, a target temperature for the interior chamber of the insulated housing, and instruct the cooling system to maintain the temperature in the interior chamber of the insulated housing at the target temperature.

In another aspect, temperature controller is disclosed. The temperature controller is disposed in an interior chamber of an insulated housing and communicatively coupled to a cooling system configured to manage a temperature of a battery disposed in the interior chamber of the insulated housing. The temperature controller includes at least one processor in communication with at least one memory device. The at least one processor is configured to determine a reference current level at the battery, compute, based on the reference current level, a target temperature for the interior chamber of the insulated housing, and instruct the cooling system to maintain the temperature in the interior chamber of the insulated housing at the target temperature.

In another aspect, a method of operating a temperature controller is disclosed. The temperature controller is disposed in an interior chamber of an insulated housing and communicatively coupled to a cooling system configured to manage a temperature of a battery disposed in the interior chamber of the insulated housing. The temperature controller includes at least one processor in communication with at least one memory device. The method includes determining, by the temperature controller, a reference current level at the battery, computing, by the temperature controller, based on the reference current level, a target temperature for the interior chamber of the insulated housing, and instructing, by the temperature controller, the cooling system to maintain the temperature in the interior chamber of the insulated housing at the target temperature.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
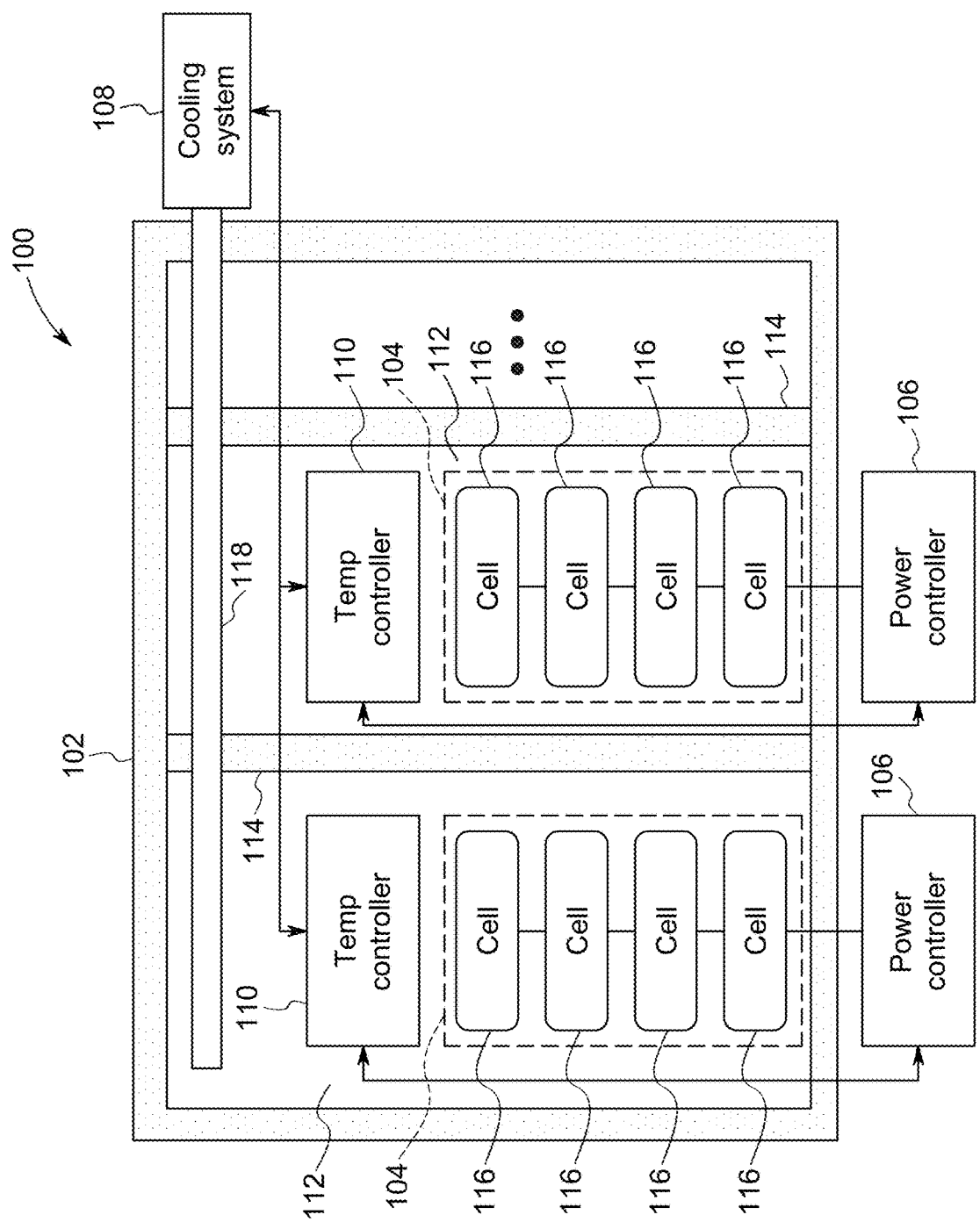
FIG. 1 depicts a schematic view of an exemplary energy storage system.

FIG. 1 depicts an exemplary energy storage system 100. Energy storage system 100 includes an insulated housing 102, at least one battery 104, at least one power controller 106, at least one cooling system 108, and at least one temperature controller 110. In some embodiments, energy storage system 100 is a grid energy storage system configured to store energy within a power grid.

Insulated housing 102 defines one or more interior chambers 112. Each interior chamber 112 includes at least one battery 104. In embodiments where insulated housing 102 includes more than one interior chamber 112, insulated partitions 114 separate interior chambers 112. Insulated housing 102 and insulated partitions 114 are at least in part made of a thermal insulation that reduces heat transfer, such as fiberglass or polystyrene foam. As such, each interior chamber 112 is thermally isolated from the exterior of insulated housing 102 and from other interior chambers 112, such that each interior chamber 112 may have a different temperature.

Batteries 104 are disposed in interior chambers 112 and are configured to provide direct current (DC) power, for example, to power an electrical load. Batteries 104 may be recharged by applying a current to batteries 104. In some embodiments, batteries 104 include a plurality of battery cells 116. Battery cells 116 may be, for example, lithium ion, nickel-cadmium, lead acid, sodium sulfur, or another battery type suitable for use in energy storage system 100.

Each battery 104 has a limited lifetime of operation (sometimes referred to herein as a "battery life" or a "battery lifetime), after which the battery 104 no longer functions to provide useful power. The battery lifetime depends on many different variables, including the type of battery, the temperature at which the battery operates, and the current at which the battery operates. For example, for a given battery 104 operating at a particular current level, a target temperature (e.g., an optimal temperature) can be determined to achieve the longest lifetime for battery 104. Notably, when the current level of battery 104 changes, the target temperature may also change.

Power controllers 106 are configured to regulate the charging and discharging of batteries 104. The charge or discharge rate of each battery 104 is proportional to a current level at the battery 104. Accordingly, by controlling the current level through each battery 104, power controllers 106 control the rate at which batteries 104 charge and discharge. In some embodiments, power controllers 106 are configured to convert DC power provided by batteries 104 into another type of power, for example, alternating current (AC) power or DC power of a different voltage. In some embodiments, power controllers 106 are capable of measuring parameters of batteries 104, such as the current level, the charge and/or discharge rate, a voltage level, a temperature, a state of charge, and/or other parameters. In some embodiments, power controllers 106 limit a maximum current level flowing through each battery 104. Limiting the current level ensures batteries 104 are charged or discharged at a safe rate and prolongs the battery lifetime.

Power controllers 106 have different modes of operation, such as a charging mode, a discharging mode, and a standby mode. In the charging mode, power controller 106 provides a current to batteries 104 causing power to flow into batteries 104. In the discharging mode, power controller 106 allows a current to flow from batteries 104, for example, to power a load. In the standby mode, power controller 106 does not allow current to or from batteries 104, for example, while power is being stored in batteries 104. During the charging mode and discharging mode, power controllers 106 may regulate an amount of current through batteries 104. For example, during charging mode, the current may depend on the availability of a power source to provide power to charge batteries 104, and during the discharging mode, the current level may depend on the demands of the load powered by batteries 104. In some embodiments, power controllers are able to predict a current level demand for batteries 104 for a future time. For example, in embodiments where energy storage system 100 is a grid energy storage system, power controllers 106 may determine the current levels for batteries 104 based on a predicted grid power demand.

Cooling system 108 is configured to manage the temperature in interior chambers 112, for example, by providing a heated or cooled fluid to interior chambers 112, by utilizing solid state cooling elements to provide or remove heat from interior chambers 112, and/or by utilizing other heating and cooling methods. In some example embodiments, cooling system 108 is a heating, ventilation, and air conditioning (HVAC) system configured to supply heated or cooled air to each interior chamber 112. Cooling system 108 is capable of maintaining the temperature of each interior chamber 112 at a specific temperature, which may be, for example, a temperature below an ambient temperature exterior to insulated housing 102. In some embodiments where insulated housing 102 includes a plurality of interior chambers 112, cooling system 108 is capable of maintaining a different temperature in each interior chamber 112. In some embodiments, cooling system 108 is coupled in flow communication with at least one duct 118 through which cooling system may provide, for example, heated or cooled fluid (e.g., air) to interior chambers 112. In embodiments where different interior chambers 112 are maintained at different temperatures, cooling system 108 and/or duct 118 may include one or more baffles to direct a specific volume of heated or cooled fluid to each interior chamber 112. Additionally or alternatively, each interior chamber 112 may have its own corresponding cooling system 108. In such embodiments, each cooling system 108 may be disposed in a corresponding interior chamber 112, or each cooling system 108 may be disposed external to and coupled in flow communication with a corresponding interior chamber 112 via a duct 118.

Temperature controllers 110 are communicatively coupled to cooling system 108 and are configured to control cooling system 108 to maintain a target temperature in each interior chamber 112 for maximum battery lifetime. Temperature controllers 110 are communicatively coupled to respective power controllers 106 and are configured to receive information from the power controllers 106 such as a present current level, a present charge or discharge rate, a present state of charge, and/or other parameters of batteries 104.

Temperature controllers 110 are configured to compute a target temperature based on respective reference current levels of batteries 104, for example, to increase the battery lifetime of batteries 104. Temperature controllers 110 determine the reference current levels for batteries 104, for example, by detecting a present current level at batteries 104 and/or predicting a current level at batteries 104 for a given time. In some embodiments, temperature controllers 110 detect the present current level by receiving the present current level from respective power controllers 106. In such embodiments, the present current level may be determined by taking an average of current measurements over a time constant, such as one hour. In some embodiments, temperature controllers 110 may additionally or alternatively determine the reference current level by predicting the current level for a given time based, for example, on a time of day, a time of year, current or expected weather conditions, a current or predicted power demand, and/or other factors related to the current level or charge and discharge rate of batteries 104.

Temperature controllers 110 compute the target temperature based on the determined reference current level. For example, each temperature controller 110 may use a lookup table or formula characterizing the relationship between current level and target temperature to compute the target temperature based on the received current level. In some embodiments, the relationship between current, temperature, and battery lifetime is different depending on whether batteries 104 are charging or discharging, and a different lookup table or formula is used depending on whether batteries 104 are charging or discharging. Each temperature controller 110 then instructs cooling system 108 to maintain the corresponding interior chamber 112 at the target temperature. In some embodiments, each temperature controller 110 includes a processor in communication with a memory device and configured to execute functions of temperature controller 110.

In some embodiments, temperature controllers 110 are configured to account for heat generated or consumed by batteries 104 during charging and discharging when computing the target temperature. During charging and discharging, exothermic and/or endothermic reactions occur in batteries 104, which generate or consume heat, respectively. Depending, for example, on the charge rate and/or state of charge of batteries 104, batteries 104 may generate or consume a certain amount of heat. This transfer of heat may be used in conjunction with cooling system 108 to regulate the temperature of batteries 104. Utilizing heat generated or consumed by batteries 104 to heat or cool batteries 104 to the target temperature may reduce the heating or cooling load on cooling system 108, increasing the efficiency of energy storage system 100.

In some such embodiments, temperature controller computes a predicted deviation in temperature of interior chamber 112 due to batteries 104 based on a present current level and state of charge of battery 104. Temperature controller 110 then computes an adjusted target temperature based on the target temperature and the predicted deviation. Temperature controller 110 then instructs cooling system 108 to maintain interior chamber 112 at the adjusted target temperature.

In some embodiments, temperature controller 110 is additionally or alternatively configured to adjust the current at battery 104 to account for heat generated or consumed by battery 104 to maintain the target temperature. In such embodiments, temperature controller 110 computes a predicted deviation in temperature of interior chamber 112 due to batteries 104 based on a present current level and state of charge of battery 104. Temperature controller 110 then computes an adjusted current level based on the target temperature and predicted deviation and instructs power controller 106 to adjust the present current level at battery 104 to the adjusted current level.

Figure 2:
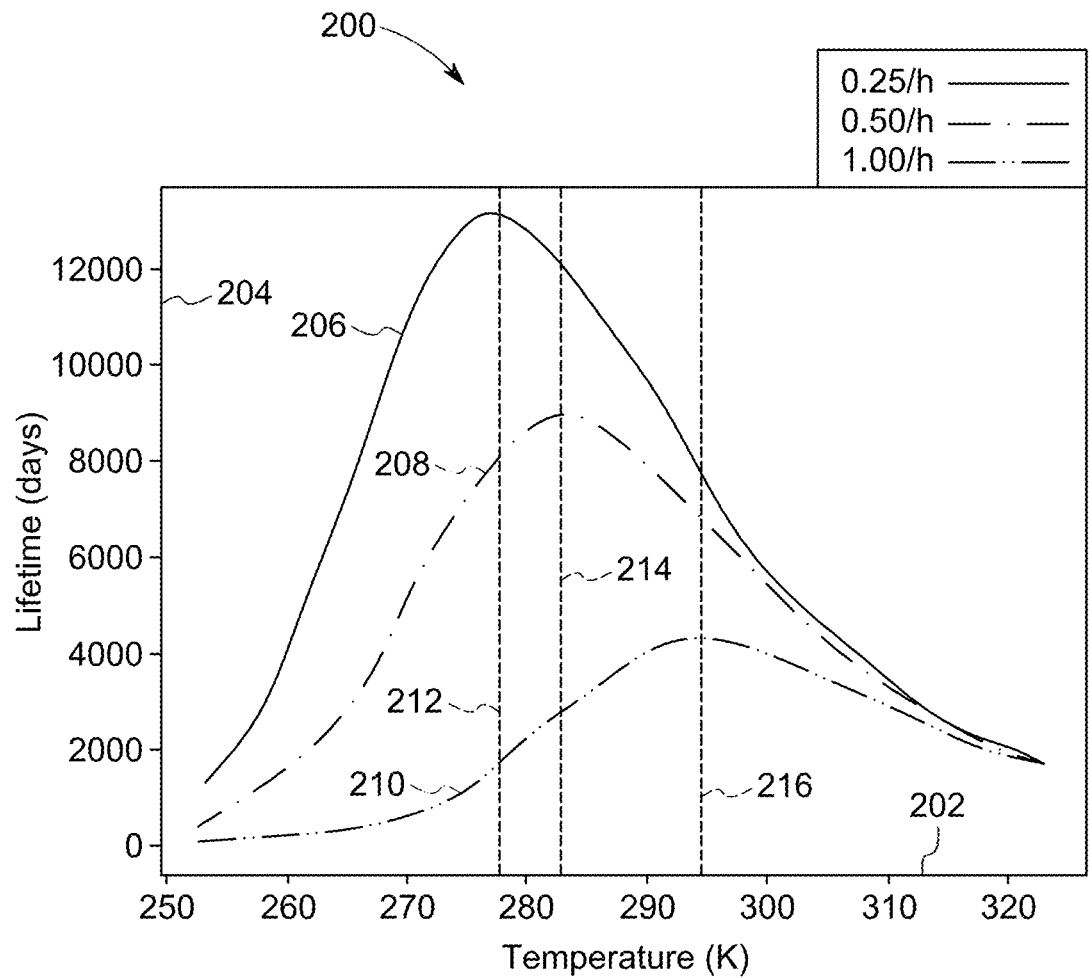
FIG. 2 depicts a graph showing a relationship between temperature, battery lifetime, and discharge rate of a battery.

FIG. 2 depicts a graph 200 showing a relationship between temperature, battery lifetime, and charge rate of a battery such as battery 104 shown in FIG. 1. Horizontal axis 202 corresponds to a temperature of the battery, and is expressed in degrees kelvin ranging from 250 to 320. Vertical axis 204 corresponds to a battery lifetime of the battery, and is expressed in days ranging from 0 to 14,000. Charge rate is expressed as the current through the battery divided by the theoretical current draw under which the battery would deliver its nominal rated capacity in one hour. A first curve 206 represents the relationship between temperature and battery lifetime for a battery having a charge rate of 0.25 per hour, a second curve 208 represents the relationship for a battery having a charge rate of 0.50 per hour, and a third curve 210 represents the relationship for a battery having a charge rate of 1.00 per hour.

First curve 206 has a maximum at a first temperature 212 of approximately 278 degrees kelvin, indicating that for a battery having a charge rate of 0.25 per hour, battery lifetime of the battery is maximized if the battery temperature is 278 degrees kelvin. Accordingly, when temperature controller 110 detects that battery 104 has a charge rate of 0.25 per hour, temperature controller instructs cooling system 108 to maintain a temperature of 278 degrees kelvin in interior chamber 112.

Second curve 208 has a maximum at a second temperature 214 of approximately 282 degrees kelvin, indicating that for a battery having a charge rate of 0.50 per hour, battery lifetime of the battery is maximized if the battery temperature is 282 degrees kelvin. Accordingly, when temperature controller 110 detects that battery 104 has a charge rate of 0.50 per hour, temperature controller instructs cooling system 108 to maintain a temperature of 282 degrees kelvin in interior chamber 112.

Third curve 210 has a maximum at a third temperature 216 of approximately 294 degrees kelvin, indicating that for a battery having a charge rate of 1.00 per hour, battery lifetime of the battery is maximized if the battery temperature is 294 degrees kelvin. Accordingly, when temperature controller 110 detects that battery 104 has a charge rate of 1.00 per hour, temperature controller instructs cooling system 108 to maintain a temperature of 294 degrees kelvin in interior chamber 112.

Figure 3:
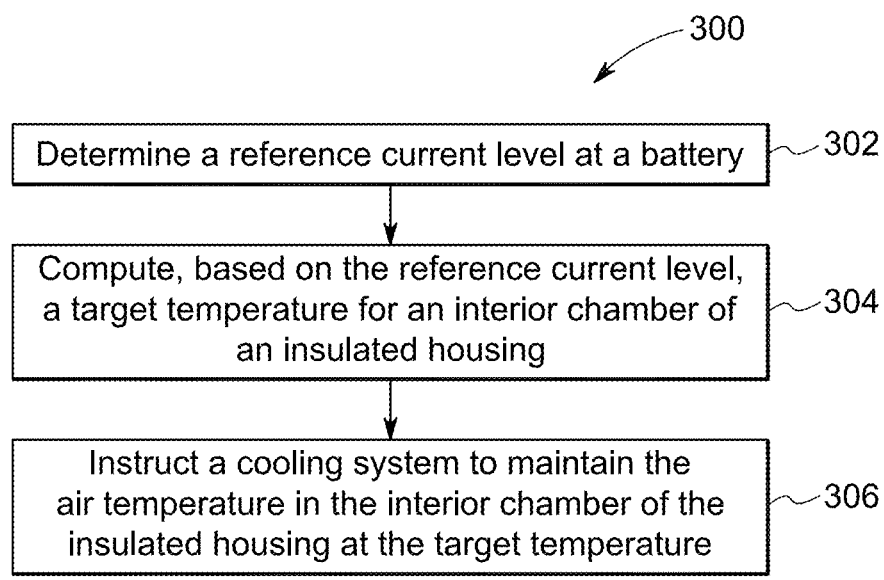
FIG. 3 depicts an exemplary method for operating a temperature controller of an energy storage system.

FIG. 3 depicts an exemplary method 300 for operating temperature controller 110 (shown in FIG. 1). Method 300 includes determining 302, by temperature controller 110, a reference current level at a battery.

Method 300 further includes computing 304, by temperature controller 110, based on the reference current level, a target temperature for an interior chamber of an insulated housing. In some embodiments, the target temperature corresponds to an increased battery lifetime of the battery.

Method 300 further includes instructing 306, by the temperature controller, a cooling system to maintain a temperature in the interior chamber of the insulated housing at the target temperature.

The embodiments described herein include an energy storage system including an insulated housing defining an interior chamber, a battery disposed within the interior chamber of the insulated housing, a cooling system configured to manage a temperature of the interior chamber of the insulated housing, and a temperature controller communicatively coupled to the cooling system and including at least one processor in communication with at least one memory device. The at least one processor is configured to determine a reference current level at the battery, compute, based on the reference current level, a target temperature for the interior chamber of the insulated housing, and instruct the cooling system to maintain the temperature in the interior chamber of the insulated housing at the target temperature.

An exemplary technical effect of the methods, systems, and apparatus described herein includes at least one of: (a) prolonging a battery lifetime of a battery by dynamically controlling the temperature of the battery based on a reference current level of the battery; (b) prolonging a battery lifetime of batteries in an energy storage system by individually controlling the temperature of each battery based on a reference current level of the individual battery; (c) increasing the efficiency of controlling the temperature of a battery by controlling the temperature based at least in part on a computation of a current amount of heat being produced or consumed by the battery based on a reference current level of the battery.

Exemplary embodiments of an energy storage system are described herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the exemplary embodiment can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A temperature controller disposed within an interior chamber of an insulated housing and communicatively coupled to (i) a cooling system disposed outside of the insulated housing and (ii) a power controller that is electrically coupled to a battery and disposed outside of the insulated housing, the temperature controller configured to manage a temperature of the battery disposed in the interior chamber of the insulated housing of an energy storage system, said temperature controller comprising at least one processor in communication with at least one memory device, said at least one processor configured to:
    determine a reference current level at the battery based on a present current level determined by said power controller;
    compute, based on the reference current level, a target temperature for the interior chamber of the insulated housing; and
    instruct the cooling system to maintain the temperature in the interior chamber of the insulated housing at the target temperature by providing one of a heated fluid or a cooled fluid via a duct in flow communication with the cooling system and extending through the insulated housing,
    wherein the duct is in flow communication with the interior chamber of the insulated housing.

2. The temperature controller of claim 1, wherein the battery includes a plurality of battery cells.

3. The temperature controller of claim 1, wherein the cooling system is coupled in flow communication with the interior chamber of the insulated housing via the duct.

4. The temperature controller of claim 1, wherein said power controller electrically coupled to the battery is configured to regulate a current level through the battery.

5. The temperature controller of claim 1, wherein said at least one processor is further configured to:
    compute a predicted deviation in temperature of the interior chamber based on the present current level and a state of charge of the battery;
    compute an adjusted target temperature based on the target temperature and the predicted deviation; and
    instruct said cooling system to maintain the temperature of the interior chamber at the adjusted target temperature.

6. The temperature controller of claim 1, wherein said at least one processor is further configured to:
    compute a predicted deviation in temperature of the interior chamber based on the reference current level and a state of charge of the battery;
    compute an adjusted current level based on the target temperature and the predicted deviation; and
    instruct the power controller to adjust the present current level at the battery to the adjusted current level.

7. A method of operating a temperature controller, the temperature controller disposed in an interior chamber of an insulated housing and communicatively coupled to (i) a cooling system disposed outside of the insulated housing and (ii) a power controller that is electrically coupled to a battery and disposed outside of the insulated housing, the temperature controller configured to manage a temperature of the battery disposed in the interior chamber of the insulated housing, the temperature controller including at least one processor in communication with at least one memory device, said method comprising:
    determining, by the power controller, a present current level;
    determining, by the temperature controller, a reference current level at the battery based on the determined present current level;
    computing, by the temperature controller, based on the reference current level, a target temperature for the interior chamber of the insulated housing; and
    instructing, by the temperature controller, the cooling system to maintain the temperature in the interior chamber of the insulated housing at the target temperature by providing one of a heated fluid or a cooled fluid via a duct in flow communication with the cooling system and extending through the insulated housing,
    wherein the duct is in flow communication with the interior chamber of the insulated housing.

8. The method of claim 7, further comprising:
    computing, by the temperature controller, a predicted deviation in temperature of the interior chamber based on the reference current level and a state of charge of the battery;
    computing, by the temperature controller, an adjusted target temperature based on the target temperature and the predicted deviation; and
    instructing, by the temperature controller, said cooling system to maintain the temperature of the interior chamber at the adjusted target temperature.

9. An energy storage system comprising:
an insulated housing defining an interior chamber;
a battery disposed within the interior chamber of said insulated housing;
a cooling system configured to manage a temperature of the interior chamber of said insulated housing, the cooling system disposed outside of said insulated housing;
a duct in flow communication with said cooling system and extending through said insulated housing, said duct in flow communication with the interior chamber of said insulated housing;
a power controller electrically coupled to said battery and disposed outside of said insulated housing; and
a temperature controller disposed within the interior chamber of said insulated housing, said temperature controller communicatively coupled to said cooling system and said power controller, and said temperature controller comprising at least one processor in communication with at least one memory device, said at least one processor configured to:
 determine a reference current level at said battery based on a present current level determined by said power controller;
 compute, based on the reference current level, a target temperature for the interior chamber of said insulated housing; and
 instruct the cooling system to maintain the temperature in the interior chamber of said insulated housing at the target temperature.

10. The energy storage system of claim 9, wherein the battery comprises a plurality of battery cells.

11. The energy storage system of claim 9, wherein said power controller is configured to regulate a current level through said battery.

12. The energy storage system of claim 9, wherein said cooling system comprises a heating, ventilation, and air conditioning (HVAC) system.

13. The energy storage system of claim 9, wherein said cooling system is coupled in flow communication with the interior chamber of said insulated housing via the duct.

14. The energy storage system of claim 9, wherein said at least one processor is further configured to:
 compute a predicted deviation in temperature of the interior chamber based on the present current level and a state of charge of said battery;
 compute an adjusted target temperature based on the computed target temperature and the predicted deviation; and
 instruct said cooling system to maintain the temperature of the interior chamber at the adjusted target temperature.

15. The energy storage system of claim 9, wherein said at least one processor is further configured to:
 compute a predicted deviation in temperature of the interior chamber based on the reference current level and a state of charge of said battery;
 compute an adjusted current level based on the target temperature and the predicted deviation; and
 instruct said power controller to adjust the present current level at said battery to the adjusted current level.

16. The energy storage system of claim 9, wherein said insulated housing further defines a second interior chamber separated from the interior chamber by an insulated partition, and wherein the energy storage system further comprises:
 a second battery disposed in the second interior chamber of said insulated housing; and
 a second temperature controller disposed within the second interior chamber of said insulated housing, said second temperature controller communicatively coupled to said cooling system and configured to:
  determine a second reference current level at said second battery;
  compute, based on the second reference current level, a second target temperature for the second interior chamber of said insulated housing; and
  instruct the cooling system to maintain a temperature in the second interior chamber of said insulated housing at the second target temperature.

17. The energy storage system of claim 16, wherein the second target temperature is different than the target temperature.

* * * * *